United States Patent
Nogami

[11] Patent Number: 5,730,547
[45] Date of Patent: Mar. 24, 1998

[54] KNUCKLE BRACKET

[75] Inventor: Shusaku Nogami, Minokamo, Japan

[73] Assignee: Kayaba Kogyo Kabushiki Kaisha, Tokyo, Japan

[21] Appl. No.: 571,719

[22] Filed: Dec. 13, 1995

[30] Foreign Application Priority Data

Dec. 14, 1994 [JP] Japan ................. 6-333088
Aug. 31, 1995 [JP] Japan ................. 7-246740

[51] Int. Cl.$^6$ ........................... B60G 15/00
[52] U.S. Cl. ............... 403/405.1; 403/384; 248/230.1; 280/668; 280/96.1
[58] Field of Search .................. 403/273, 344, 403/234, 24, 337, 384, 274, 282, 405.1; 280/661, 668, 901, 96.1; 248/300, 631, 562, 230.1, 230.6, 230.2

[56] References Cited

U.S. PATENT DOCUMENTS

| | | | |
|---|---|---|---|
| 3,941,401 | 3/1976 | Allison | 280/673 |
| 4,491,339 | 1/1985 | Mizumukai et al. | 280/668 |
| 4,706,987 | 11/1987 | Pettibone et al. | 280/661 |
| 5,145,204 | 9/1992 | Perkins | 280/668 |
| 5,170,973 | 12/1992 | Ohta | 280/668 X |
| 5,180,129 | 1/1993 | Yamaoka et al. | 280/668 X |
| 5,228,717 | 7/1993 | Perkins | 280/668 |

FOREIGN PATENT DOCUMENTS

| | | | |
|---|---|---|---|
| 56-160442 | 12/1981 | Japan . | |
| 58-63506 | 4/1983 | Japan . | |
| 61-13790 | 4/1986 | Japan . | |
| 208167 | 8/1990 | Japan | 280/661 |
| 6032245 | 2/1994 | Japan | 280/661 |

*Primary Examiner*—Harry C. Kim
*Attorney, Agent, or Firm*—McGlew and Tuttle

[57] ABSTRACT

In mounting an outer shell, welding is not required, and processing and locating of mounting holes are facilitated without lowering the fatigue and strength of the outer shell. A knuckle bracket comprising a bracket body A1, A2, A3, A4, A5, A6 on which an outer shell is mounted, a pair of parallel holding portions 10, 20, 21, 32 for mounting a knuckle arm extended laterally from the bracket body, and opposed mounting holes 12, 13, 29, 30, 34 formed in each of the holding portions, characterized in that a press-fit hole for press-fitting a lower portion of the outer shell is formed in an upper end of the bracket body.

4 Claims, 6 Drawing Sheets

KNUCKLE BRACKET

BACKGROUND OF THE INVENTION

The present invention relates to a knuckle bracket which is interposed between a vehicle body side and a wheel side of a vehicle to suspend the vehicle body and which is used to mount a strut type shock absorber for absorbing an energy such as vibrations from a road surface.

The strut type shock absorber comprises an outer shell and a shock absorber inserted into the outer shell, and a lower portion of the outer shell is mounted near the wheel side of the vehicle while being supported on the knuckle bracket.

Figure 10:
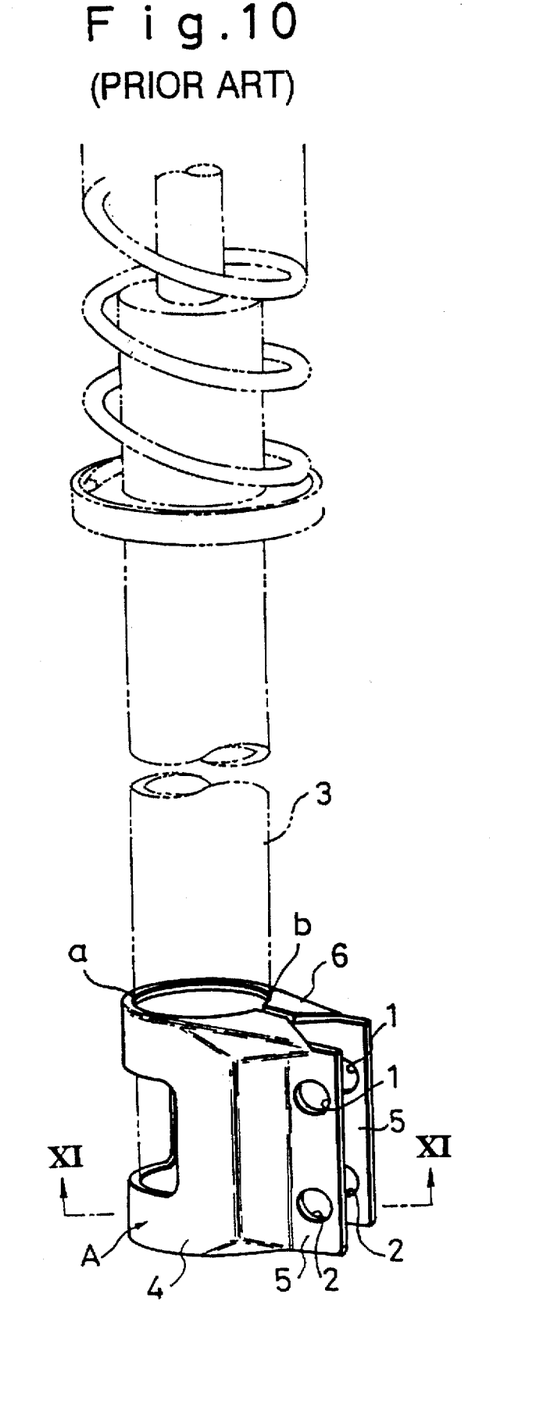
FIG. 10 is a perspective view of a conventional knuckle bracket.
Figure 11:
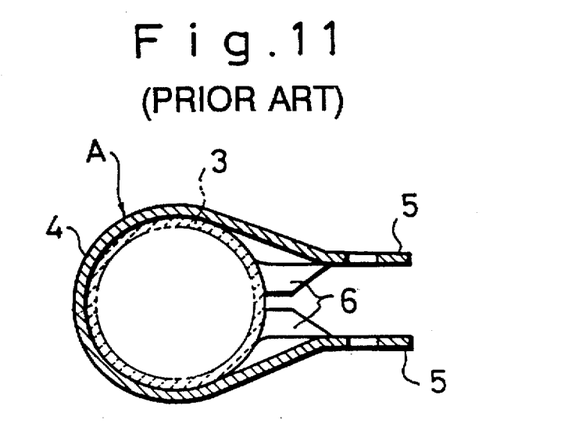
FIG. 11 is a cross sectional bottom view taken on line B—B of FIG. 10.

The knuckle brackets of this kind so far known are disclosed, for example, in Japanese Patent Application Laid-Open No. 58-63506 publication, Japanese Utility Model Publication No. 61-13790 publication, U.S. Pat. No. 4,491,339 specification, Japanese Patent Application Laid-open NO. 56-160442 publication and the like. As the typical structure, those shown, for example, in FIG. 10 and FIG. 11, are employed.

This knuckle bracket A comprises a bow-like embracing portion for embracing an outer tube or an outer shell 3, a pair of holding portions 5, 5 extending from the embracing portion 4 toward a forward side, and mounting holes 1, 2 provided laterally in the holding portions 5, 5, the embracing portion 4 and the holding portions 5, 5 being formed to have a generally U-shaped section as viewed from the plane.

The lower portion of the outer shell 3 into which the shock absorber is inserted is embraced by the embracing portion 4, and the holding portions 5, 5 are fastened by bolts inserted into bolt holes or the mounting holes 1, 2.

After the outer shell 3 has been mounted on the knuckle bracket A as described above, upper and lower end peripheral edges a of the embracing portion 4 and inner peripheral portions b of supports 6, 6 provided above the holding portions 5, 5 are secured to the outer surface of the outer shell 3 by welding.

However, the above-described conventional knuckle bracket A has the following inconveniences:

① Since the knuckle bracket A has the U-shaped section, the embracing force thereof is so weak merely by fastening the holding portions 5, 5 that one or both of the upper/lower peripheral edges of the embracing portion 4 and the inner peripheral portion of the support 6 have to be welded. This results in poor workability and high cost. Further, when welding is made as described above, a portion subjected to the maximum bending moment of the outer shell 3 when welded is thermally affected to possibly lower the fatigue strength of the outer shell.

② The embracing portion 4 constituting the knuckle bracket A is pressed into a bow-like configuration because the former corresponds to the outer peripheral portion of the outer shell 3. Because of this, locating corresponding to a bending angle and a bending position is difficult when the embracing portion 4 is processed. When the bending angle or the bending position is deviated, the mounting holes 1, 1 and 2, 2 formed in the holding portions 5, 5 are not opposed to each other. Accordingly, it is necessary either to make the mounting holes larger so that the mounting holes 1, 1 and 2, 2 are always opposed to each other or to perform boring work so that the mounting holes 1, 1 and 2, 2 are opposed to each other after welding, which deteriorates processibility.

SUMMARY OF THE INVENTION

It is therefore an object of the present invention to provide a knuckle bracket in which in mounting an outer shell, welding made to a portion receiving the maximum bending moment of the outer shell is not required, the fatigue and strength of the outer shell are not lowered, and boring and locating of mounting holes can be easily made.

For achieving the aforementioned object, the present invention provides a knuckle bracket comprising a bracket body on which an outer shell is mounted, a pair of parallel holding portions for mounting a knuckle arm laterally extended from the bracket body, and mounting holes opposed to each other formed in each of the holding portions, characterized in that the bracket body is formed at an upper end thereof with a press-fit hole for press-fitting a lower portion of the outer shell.

In this case, it is noted that the bracket body may comprise a horizontal support and a pair of bow-like embracing portions hung down through a bent portion from both sides of the support, the holding portion being extended on the forward side of each of the embracing portions, and the press-fit hole located on the same axis as that of an inner periphery of said holding portions may be formed in the central portion of the support.

It is further noted that a tubular guide in communication with the press-fit hole may be projected from the upper surface or the lower surface of the support, and the tubular guide and the press-fit hole may allow the central portion of the support to be bended upward or downward.

Similarly, the bracket body maby be composed of a pair of upper and lower parallel supports, and a connecting frame for integrally connecting one ends of the supports, a holding portion is integrally provided on the other end of each of the supports, and a pair of press-fit holes opposed to each other may be formed in the central portion of the support. In this case, preferably, a tubular guide in communication with the press-fit hole is projected from an upper surface or a lower surface of each of the supports is projected or the tubular guide and the press-fit hole may allow the central portion of each of the supports to be bent upward or downward.

Alternatively, the bracket body is composed of a cylindrical body having a semi-circular section, the cylindrical body having holding portions extended on the forward side of both ends thereof, and the cylindrical body is provided with stopping pieces on the forward side of an upper end thereof whereby the stopping pieces are welded while being opposed to each other or being embraced to each other to form a press-fit hole at the upper end of the cylindrical body.

According to the aforementioned constitution, the outer shell is pressed fitted into the press-fit hole, and the outer shell and the knuckle bracket can be connected merely by welding the lower portion of the outer shell and the lower portion of the bracket body. In this case, since the outer shell is press-fitted into the press-fit hole, it is not necessary to weld the edge of the press-fit hole to the outer shell.

DETAILED DESCRIPTION OF THE PREFERRED EMBODIMENTS

The knuckle bracket according to the present invention comprises a bracket body on which an outer shell is mounted, a pair of parallel holding portions for mounting a knuckle arm extended laterally from the bracket body, and mounting holes opposed to each other formed in each of the holding portions, the bracket body being formed at an upper end thereof with a press-fit hole for press-fitting a lower portion of the outer shell.

Figure 1:
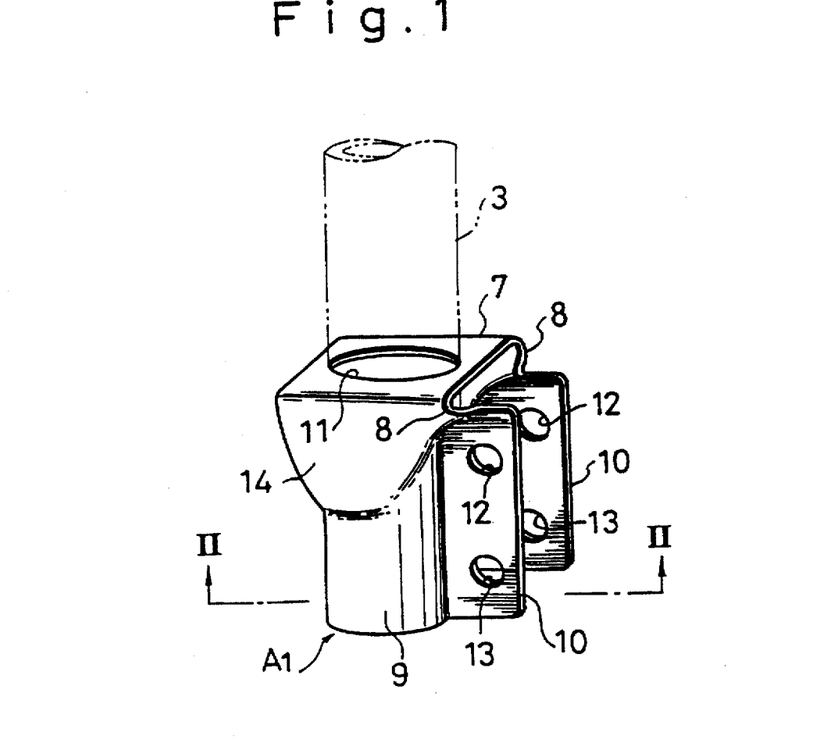
FIG. 1 is a perspective view of a knuckle bracket according to an embodiment of the present invention.
Figure 2:
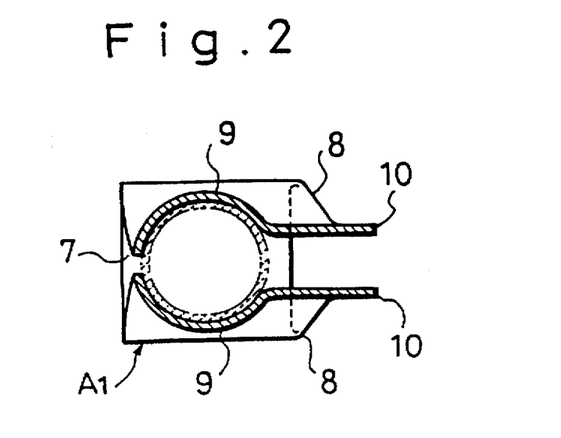
FIG. 2 is a cross sectional bottom view taken on line A—A of the knuckle bracket shown in FIG. 1.

For example, FIGS. 1 and 2 show one embodiment of the present invention according to claim 1. The purpose of using the knuckle bracket is the same as that of prior art shown in FIG. 10.

The knuckle bracket shown in FIGS. 1 and 2 comprises a bracket body A1 composed of a horizontal support 7 and a pair of bow-like embracing portions 9, 9 hung down from left and right sides of the support 7 through bent portions 8, 8, and is further provided with a pair of parallel holding portions 10, 10 vertically extended on the forward side of each of the embracing portions 9, 9, a longitudinal press-fit hole 11 positioned on the same axis as that of an inner periphery of each of said holding portions 9, 9, and two upper and lower lateral mounting holes 12, 12 and 13, 13 formed in each of the holding portions 10, 10.

In this case, the bent portions 8, 8 and the embracing portions 9, 9 may be directly provided in immediate connection with each other. However, preferably, an outwardly inflated or expanded inflated portion 14 is provided halfway, and the bent portions 8, 8 and the inflated portions or expanded portions 14, 14 are used as reinforcing ribs. The bent portions 8 and inflated portions or expanded portions 14 provide a transition zone between the upper edge of the embracing portions 9 and the upper edge of the parallel holding portions 10 and the outer periphery of the substantially planar support piece or horizontal support piece 7. This outer periphery is radially outwardly of the embracing portions 9.

While the longitudinal press-fit hole 11 may be formed by boring a hole through a central portion of the support 7, it is to be noted that a tubular guide in communication with a longitudinal hole may be projected on an upper surface or a lower surface of the support. Further, the tubular guide and the longitudinal hole may be formed by bending the central portion of the support upward or downward.

Figure 3:
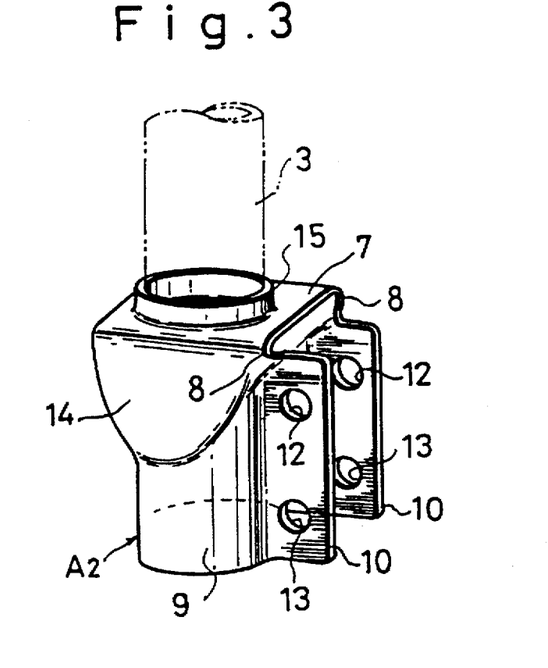
FIG. 3 is likewise a perspective view of a knuckle bracket according to another embodiment of the present invention.
Figure 4:
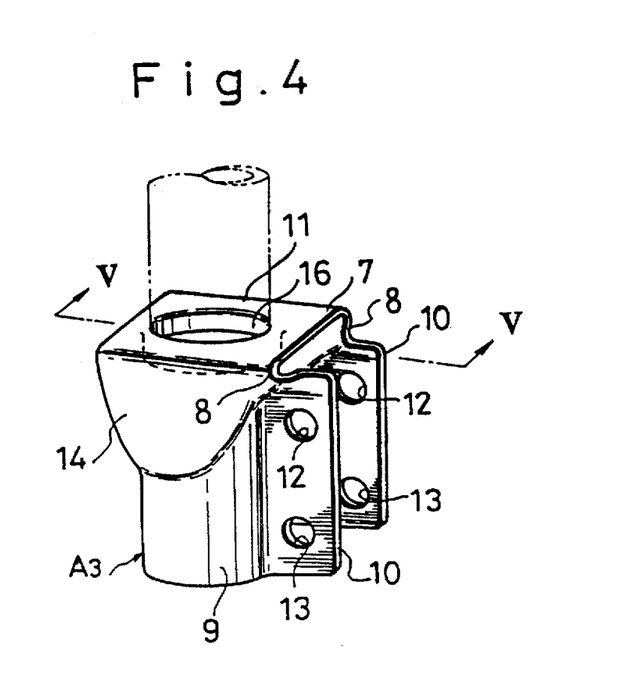
FIG. 4 is likewise a perspective view of a knuckle bracket according to still another embodiment of the present invention.

That is, as shown in FIGS. 3 and 4, a bracket body A2, or A3 is constituted by a horizontal support 7 and an embracing portion 9, in the same manner as described in FIG. 1, and tubular guides 15, 16 having a suitable length provided in immediate connection with a longitudinal press-fit hole 11 are projected so that when the outer shell 3 is press-fitted into the tubular guides 15, 16 and the press-fit hole 11, a contact area therebetween is made large so as to smoothly press-fit the outer shell.

In the embodiment shown in FIG. 3, the tubular guide 15 is projected on the upper side of the support 7. The tubular guide 15, which is formed from a separate member, may be erected to be fixed on the support 7; otherwise, a circumferential part of the hole which is formed in the center of the support 7 may be bent to be erected upward.

Figure 5:
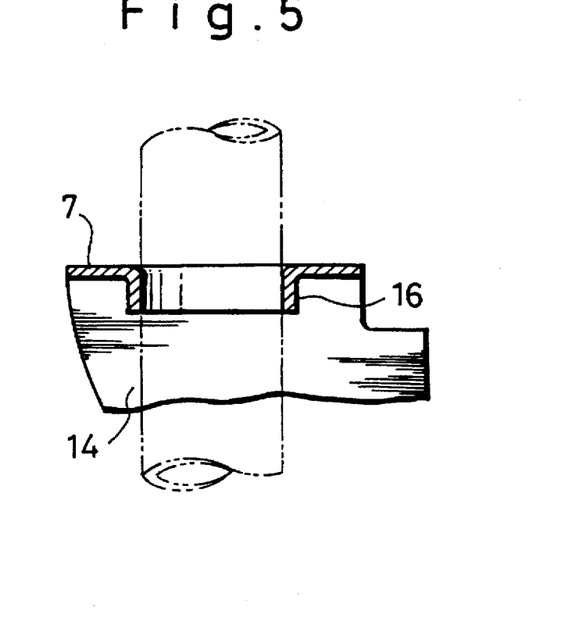
FIG. 5 is a longitudinal fragmentary side view taken on line C—C of FIG. 4.

On the other hand, in the embodiment shown in FIG. 4, the tubular guide 16 is projected on the lower side of the support 7. The tubular guide 16, which is formed from a separate member, may be connected to the lower surface of the support 7; otherwise, as shown in FIG. 5, it may be formed by downward bending the center of the support 7. Other structure, operation and effect are the same as those shown in FIG. 1.

In the knuckle bracket according to the embodiments shown in FIGS. 1 to 5, the outer shell and the knuckle bracket can be connected merely by press-fitting the outer shell 3 downward into the longitudinal press-fit hole 11 or both the tubular guides 15, 16 and the longitudinal press-fit hole 11, and then welding the lower portion of the outer shell 3 with the lower portion of the embracing portion 9.

Therefore, it is not necessary to connect the portion opposite the longitudinal hole 11, that is, the portion receiving the maximum bending moment of the outer shell 3 by welding.

Further, a knuckle on the wheel side is inserted between the holding portions 10, 10, bolts are then inserted between the mounting holes 12, 12, 13, 13 and the holding portions 10, 10 are fastened by nuts. Then, the inner peripheries of the embracing portions 9, 9 come into close contact with the outer periphery of the outer shell 3 whereby the outer shell 3 and the knuckle brackets A1, A2, A3 are more firmly connected.

In the embodiments shown in FIGS. 1, 3 and 4, while a rear portion of the embracing portion may be integrally connected, it is to be noted that a suitable spacing may be provided as shown in FIG. 2.

Figure 6:
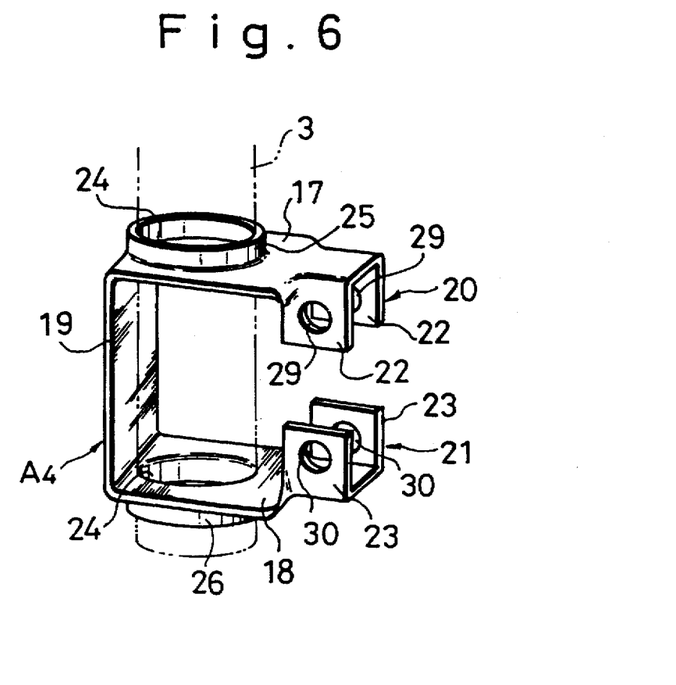
FIG. 6 is a perspective view of a knuckle bracket according to another embodiment of the present invention.
Figure 7:
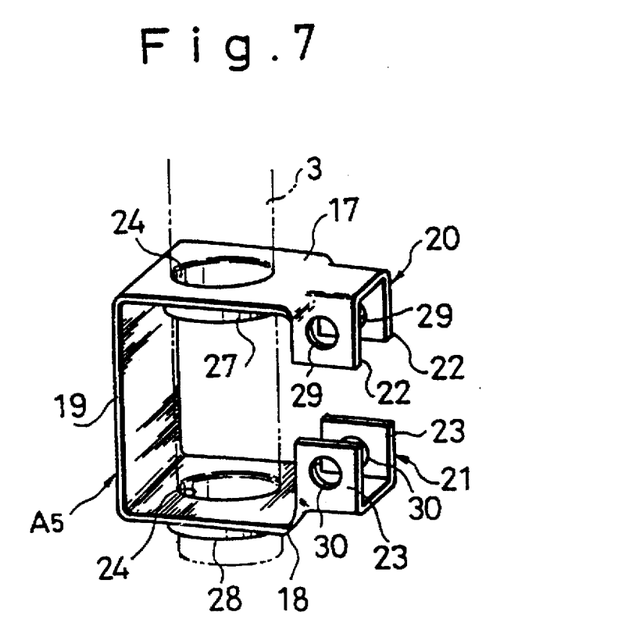
FIG. 7 is likewise a perspective view of a knuckle bracket according to still another embodiment of the present invention.

Next, FIGS. 6 and 7 show a knuckle bracket according to another embodiments. This knuckle bracket comprises bracket bodies A4 and A5 composed of a pair of parallel supports 17, 18, and a connecting frame 19 for integrally connecting one end or a rear end of each of the supports 17, 18, and is further provided with a pair of upper and lower bifurcated holding portions 20, 21 provided integrally on the other end or the forward side of the supports 17, 18, a pair of longitudinal press-fit holes 24, 24 opposite to each other formed in the center of the supports 17, 18, and lateral mounting holes 29, 29, 30, 30 formed in the holding portions 20, 21.

The longitudinal press-fit hole 24 may be singly provided. However, preferably, as shown in FIG. 7, tubular guides 25, 26 or 27, 28 in communication with the longitudinal press-fit hole 24 are projected from the lower surfaces of the supports 17, 18.

In this case, the tubular guides 25, 26, 27, 28 may be formed from separate members. Preferably, however, the tubular guides 25, 26 or 27, 28 and the longitudinal press-fit hole 24 are formed by bending upward or downward the centers of the supports 17, 18.

According to the knuckle brackets shown in FIG. 6 and 7, the outer shell 3 and the knuckle bracket can be connected merely by press-fitting the outer shell 3 into the longitudinal press-fit holes 24, 24 of the supports 17, 18 or press-fitting the outer shell 3 into the holes 24, 24 and the tubular guides 25, 26 or 27, 28, and then welding the lower portion of the outer shell with the lower hole 24, or with the lower tubular guides 26, 28. Therefore, it is not necessary to connect the portion receiving the maximum bending moment of the outer shell 3 by welding.

The holding portions 20, 21 are provided vertically opposite to each other. The holding portions 20, 21 comprise holding pieces 22, 22, 23, 23 opposed to each other, mounting holes 29, 29, 30, 30 provided laterally in the holding pieces 22, 22, 23, 23. The knuckle on the wheel side is inserted between the holding pieces 22 and 22, and 23 and 23, and bolts inserted into mounting holes 29, 30 are fastened by nuts to connect the knuckle bracket to the knuckle.

Figure 8:
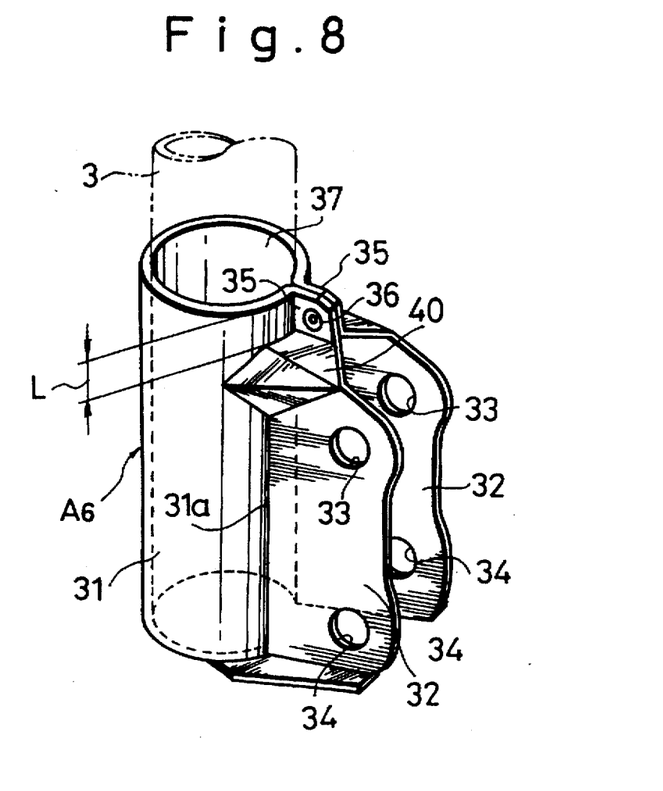
FIG. 8 is likewise a perspective view of a knuckle bracket according to still yet another embodiment of the present invention.

FIG. 8 shows a knuckle bracket according to still yet another embodiment of the present invention. In this knuckle bracket, a bracket body A6 is constituted by a tubular body 31 having a semicircular section whose forward side is opened, holding portions 32, 32 provided with mounting holes 33, 34 are extended from the forward sides of both ends 31a of the tubular body 31, and stop pieces 35, 35 opposed to each other are provided on the forward side of the upper end of the tubular body 31 or the part above the holding portions 32, 32. Centers 36 of the stop pieces 35, 35 are connected together by spot or projection welding to thereby form a press-fit hole 37 having a depth L in the upper end of the tubular body 31.

In this case, the stop pieces 35, 35 are connected opposite to each other whereby the upper end of the tubular body 31 becomes narrower to form a cylindrical portion having a depth L corresponding to a longitudinal length of the stop piece 35, said cylindrical portion constituting the press-fit hole 37.

An inwardly extending horizontal or generally horizontal rib 40 is integrally provided at an upper proximal end of the holding portions 32, 32, and the end of the rib 40 is provided in immediate connection with the lower end of the stop piece 35 to increase the strength.

Preferably, the outer shell 3 is press-fitted into the press-fit hole 37, and the periphery of the lower end of the outer shell 3 is connected with the peripheral edge of the lower end of the tubular body 31 by welding. However, since the outer shell 3 is press-fitted into the press-fit hole 37, it is not necessary to weld the peripheral edge of the press-fit hole 37 to the outer periphery of the outer shell 3.

Figure 9:
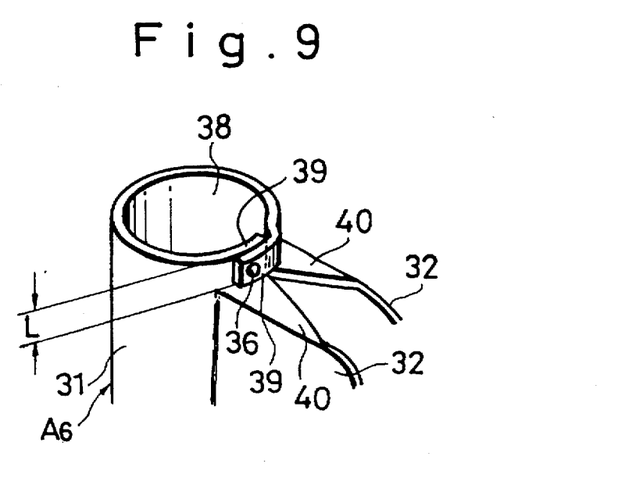
FIG. 9 is likewise a partly cutaway perspective view of a knuckle bracket according to still yet another embodiment of the present invention.

FIG. 9 shows still yet another embodiment of the present invention, in which circumferential stop pieces 39, 39 are provided on the forward side of the upper end of the tubular body 31. These two stop pieces 39, 39 are embraced to each other and centers 36 thereof are connected by spot or projection welding whereby the upper end of the tubular body 31 becomes narrower to form a press-fit hole 38 corresponding to a cylindrical portion having a depth L. Other structure, operation and effect are the same as those of the embodiment shown in FIG. 8. The same structure is indicated by the same reference numerals, the details of which are omitted.

The present invention has the following effects:

① According to the respective claims of the invention, the press-fit hole for press-fitting the lower portion of the outer shell is provided in the upper end of the bracket body, and the outer shell is press-fitted into the hole. Therefore, it is not necessary to weld the portion receiving the maximum bending moment of the outer shell, and the outer shell and the knuckle bracket can be connected merely by press-fitting, thus improving the workability. Further, since the above-described portion need not be welded, the workability is improved and the cost can be reduced. Moreover, it is possible to overcome an inconvenience in that the fatigue strength of the outer shell is lowered due to the thermal influence during welding.

② According to a further aspect of the invention, since there are provided the embracing portions and the holding portions, the embracing portions are fastened to thereby more rigidly hold the outer shell in cooperation with the press-fit hole.

③ According to another aspect of the invention, since there is provided the bent portion, the rigidity and the strength due to the ribbing effect can be increased by the provision of the bent portion.

④ According to further aspects of the invention, since the horizontal piece, the bent portion and the embracing portion are formed to be almost U-shaped as viewed from the front, the bending angle and the bending position of the bent portion and the embracing portion can be easily set and stabilized. It is therefore possible to accurately locate the mounting holes of the holding portions and processing of the mounting holes is facilitated, whereby processibility is improved.

⑤ According to another aspect of the invention, since the tubular guide in immediate connection with the press-fit hole is provided, the contact areas relative to the outer shell increases to improve the retaining force, and since the outer shell is guided in a longitudinal direction, the press-fit operation also becomes facilitated.

⑥ According to further aspects, since the upper and lower supports are furnished with the press-fit holes, the outer periphery of the press-fitted outer shell can be supported by the upper, and lower inner peripheries to vertically and accurately retain the outer shell.

⑦ According to the invention, since the upper and lower tubular guides are provided, the contact area against the outer shell increases, and when press-fitting, the outer shell can be smoothly guided to erect the outer shell more accurately.

⑧ According to the invention, since the upper and lower horizontal pieces and the connecting frame constitutes the bracket body to eliminate the left and right members, processibility can be improved, thereby saving materials.

⑨ According to the invention, since the press-fit hole can be formed merely by connecting the stop pieces with each other, hole processing is facilitated. Moreover, since the press-fit hole having a depth corresponding to the length of the stop piece can be formed, the contact area against the outer shell increases, thereby preventing stress concentration.

What is claimed is:

1. A knuckle bracket for mounting on a shock absorber outer shell, the knuckle bracket comprising:

a bracket body including a horizontal support piece, a pair of arcuate embracing portions formed integrally with said horizontal support piece and extending downwardly, perpendicular to said horizontal support piece, and a transition region including an expanded portion extending upwardly and radially outwardly from one of said embracing portions to said horizontal support piece and another expanded portion extending upwardly and radially outwardly from another of said embracing portions to said horizontal support piece, said bracket body being mountable on the outer shell;

a pair of parallel holding portions defining means for mounting a knuckle to said bracket body, said holding portions extending laterally from said bracket body embracing portions and said transition region, said transition region including a bent portion connecting one of said holding portions to said horizontal support piece and another bent portion connecting another of said holding portions to said horizontal support piece;

opposed mounting holes formed in each of said holding portions; and a press-fit hole for press-fitting said bracket body to a lower portion of the outer shell, said press-fit hole being formed in said horizontal support piece, said horizontal support piece having an integrally formed portion extending around a periphery of said press-fit hole.

2. A knuckle bracket for mounting on a shock absorber outer shell, the knuckle bracket comprising:

a bracket body including a horizontal support piece, a pair of arcuate embracing portions formed integrally with said horizontal support piece and extending downwardly, perpendicular to said horizontal support piece, and a transition region including an expanded portion extending upwardly and radially outwardly from one of said embracing portions to said horizontal support piece and another expanded portion extending upwardly and radially outwardly from another of said embracing portions to said horizontal support piece, said bracket body being mounted on the outer shell;

a pair of parallel holding portions defining means for mounting a knuckle, said holding portions extending laterally from said bracket body embracing portions and said transition region, said transition region including a bent portion connecting one of said holding portions to said horizontal support piece and another bent portion connecting another of said holding portions to said horizontal support piece, said pair of parallel holding portions being integrally connected to said bracket body;

opposed mounting holes formed in each of said holding portions; and a press-fit hole for press-fitting said bracket body to a lower portion of the outer shell, said press-fit hole being formed in said horizontal support piece, and said press-fit hole being positioned on an axis defined by an inner periphery of each of said holding portions and being disposed in a central portion of said horizontal support piece, said horizontal support piece having an integrally formed unitary portion extending around the periphery of said press-fit hole.

3. A knuckle bracket for mounting on a shock absorber outer shell, comprising:

a bracket body including a substantially planar support piece, a pair of arcuate embracing portions formed integrally with said substantially planar support piece and extending downwardly, perpendicular to said substantially planar support piece, said substantially planar support piece extending radially outwardly an extent greater than said embracing portions and a transition region extending from said embracing portions to said substantially planar support piece;

a pair of parallel holding portions defining means for mounting a knuckle to said bracket body, said holding portions extending laterally from said bracket body embracing portions and said transition region;

opposed mounting holes formed in each of said holding portions; and a press-fit hole for press-fitting said bracket body to a lower portion of the outer shell, said press-fit hole being formed in said substantially planar support piece with a central axis substantially corresponding to a central axis of said embracing portions, said substantially planar support piece having a unitary portion extending around the periphery of said press-fit hole.

4. The knuckle bracket according to claim 3, wherein said transition region includes an expanded portion extending upwardly and radially outwardly from one of said embracing portions to said substantially planar support piece and another expanded portion extending upwardly and radially outwardly from another of said embracing portions to said substantially planar support piece and a bent portion connecting one of said holding portions to said substantially planar support piece and another bent portion connecting another of said holding portions to said substantially planar support piece.

* * * * *